(12) United States Patent
Alsalim

(10) Patent No.: US 11,729,162 B2
(45) Date of Patent: Aug. 15, 2023

(54) DATA CENTER CABLE SECURITY

(71) Applicant: Saudi Arabian Oil Company, Dhahran (SA)

(72) Inventor: Ahmed Saad Alsalim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 201 days.

(21) Appl. No.: 16/990,559

(22) Filed: Aug. 11, 2020

(65) Prior Publication Data
US 2022/0052990 A1 Feb. 17, 2022

(51) Int. Cl.
*H04L 29/06* (2006.01)
*H04L 9/40* (2022.01)
*G07C 9/00* (2020.01)
*G06F 21/85* (2013.01)

(52) U.S. Cl.
CPC ............ *H04L 63/083* (2013.01); *G06F 21/85* (2013.01); *G07C 9/00571* (2013.01)

(58) Field of Classification Search
CPC ....... H04L 63/083; G06F 21/85; G06F 21/31; G07C 9/00571
USPC .......................................................... 726/6
See application file for complete search history.

(56) References Cited

U.S. PATENT DOCUMENTS

| | | | |
|---|---|---|---|
| 2002/0194294 A1* | 12/2002 | Blumenau | H04L 61/35 709/213 |
| 2018/0336324 A1* | 11/2018 | Kodama | H04L 63/083 |
| 2019/0069436 A1 | 2/2019 | Norton et al. | |

OTHER PUBLICATIONS

Yogesh Vedpathak, Cleversafe, Inc. "High-throughput cloud storage over faulty networks", Sep. 18, 2013 SDC 2013, https://www.snia.org/educational-library/high-throughput-cloud-storage-over-faulty-networks-2013. 25 pages.

(Continued)

*Primary Examiner* — Jeffrey C Pwu
*Assistant Examiner* — Nega Woldemariam
(74) *Attorney, Agent, or Firm* — Leason Ellis LLP

(57) ABSTRACT

A system and method for providing cable security in a network is generally described. The method includes receiving a request to remove a cable, where the request includes a first password and a second password, and wherein the cable connects a first port and a second port. The method further includes determining a first authenticity of the first password. After determining the first authenticity of the first password, the method further includes suspending a data flow through the cable, virtually mapping, by a storage device configuration unit, the first port to a third port, and transmitting the data flow from the third port to the second port. The method further includes determining an authenticity of the second password. After determining the authenticity of the second password, the method includes unlocking a physical lock connected to the cable.

14 Claims, 4 Drawing Sheets

(56) References Cited

OTHER PUBLICATIONS

Virtual Instruments, "The Top Ten Things to Look for to Avoid Fibre Channel San Performance Problems", Dec. 15, 2010. 14 pages.
Cisco, "Impact of FCoE and Unified Fabric on Enterprise Storage Environments: Exploration of the Benefits and Challenges Associated With Migration Toward Common SAN and LAN Infrastructure", Feb. 2010, https://www.cisco.com/c/dam/en/us/products/switches/nexus-5000-series-switches/Impact_Of_FCoE_And_Unified_Fabric.pdf. 17 pages.
Cable Wholeshale, "How to Design a Server Room", Apr. 14, 2020, https://www.cablewholesale.com/blog/index.php/2020/04/14/how-to-design-a-server-room/. 4 pages.

* cited by examiner

DATA CENTER CABLE SECURITY

FIELD OF THE DISCLOSURE

The present disclosure relates to network security and, more particularly, to a system and method which are effective to provide security relating to cable maintenance in a data center, including, by way of example, between enterprise storage systems and SAN switches.

BACKGROUND OF THE DISCLOSURE

In a network-based storage system, such as a Storage Area Network (SAN), a source computer transmits data to one or more storage devices. The data travels from the source computer, through a switch, along one or more cables, to the storage device. The switch, cables, and storage devices are often located within a designated room or data center. Maintenance of devices and their interconnections can result in inadvertent or malicious disruption of healthy connections while a technician is ostensibly present for one purpose but causes a disconnection or other disruption beyond the purpose of his visit.

It is with respect to these and other considerations that the disclosure made herein is presented.

SUMMARY OF THE DISCLOSURE

According to a basic aspect of the disclosure, a method for providing cable security in a network is described. The method comprises receiving a request to remove a cable, where the request includes a first password and a second password, and wherein the cable connects a first port and a second port. The method further comprises determining a first authenticity of the first password. The method further comprises, after determining the first authenticity of the first password: suspending a data flow through the cable, virtually mapping, by a storage device configuration unit, the first port to a third port, and transmitting the data flow from the third port to the second port. The method further comprises determining an authenticity of the second password. The method further comprises, after determining the authenticity of the second password: unlocking a physical lock connected to the cable.

In more particular implementations in accordance with the foregoing method, one or more of the following can be performed, including: (a) maintaining another lock can be in a locked position which is connected to another cable; (b) suspecting data flow through the cable by suspending the data flow through the first port; (c) prior to receiving the request for authenticating the first password, establishing a fourth port to transmit data redundantly; (d) prior to receiving the request authenticating the first password, transmitting the data flow from the first port to the second port; (e) performing the virtually mapping step by assigning a virtual address to the first port and to the third port; (f) defining the first and second passwords as one, complex password associated with the cable; (g) defining further passwords using a hardware generator (e.g., third, fourth and fifth passwords) and blocking further ports (e.g., third and fourth ports) if the passwords are not authenticated in the manner described herein for the first and second passwords; (h) combinations of the foregoing additional facets and steps.

In regard to implementations in which a complex password is defined, methods in accordance with broad aspects of this disclosure can include (i) prior to receiving the request, establishing a complex password during an initial set up of the network; (ii) generating the complex password by a key generator. Again, these can be in combination with the basic aspect of this disclosure described above or any of the more particular implementations noted above.

In accordance with another aspect of the disclosure, a method for providing cable security in a network is described. The method comprises receiving a request to remove a cable in a data center, wherein the request includes a password, and wherein the cable connects a first port and a second port. The method further comprises determining an authenticity of the password. When the password is determined to be authentic, the method suspends a data flow through the cable, maps, by a storage device configuration unit, the first port to a third port, and transmits the data flow from the third port to the second port. In a more particular implementation, prior to receiving the request, the method can include the step of transmitting the data flow from the first port to the second port.

In accordance with another aspect of the disclosure, a network cable security system is described. The network cable security system includes a memory configured to store a list of passwords and a storage device configuration unit configured to be in communication with the memory. The storage device configuration unit is configured, such as by a processor executing code therein, to be effective to receive a request to remove a first cable, wherein the request includes a first password and a second password, and wherein the first cable connects a first port and a second port. The storage device configuration unit is further configured, such as by a processor executing code, to be effective to analyze the list of passwords in the memory to determine a first authenticity of the first password. After determination of the first authenticity of the first password, the storage device configuration unit, through it configuration by code, is effective to suspend a data flow through the cable, virtually map the first port to a third port, and transmit the data flow from the third port to the second port. The storage device configuration unit is further configured by code to be effective to analyze the list of passwords to determine an authenticity of the second password, and, after determination of the authenticity of the second password, the storage device configuration unit unlocks a physical lock connected to the cable by executing code which configures the configuration unit for that purpose.

16. In more particular implementations, systems in accordance with this disclosure can be configured to programmatically implement steps as described above, using code from a memory which is executed in at least one processor of a storage device configuration unit of the type described above and herein.

These and other aspects, features, and advantages can be appreciated from the accompanying description of certain embodiments according to the present disclosure and the accompanying drawing figures and claims.

BRIEF DESCRIPTION OF THE DRAWING FIGURES

DESCRIPTION OF CERTAIN EMBODIMENTS OF THE DISCLOSURE

Figure 1:
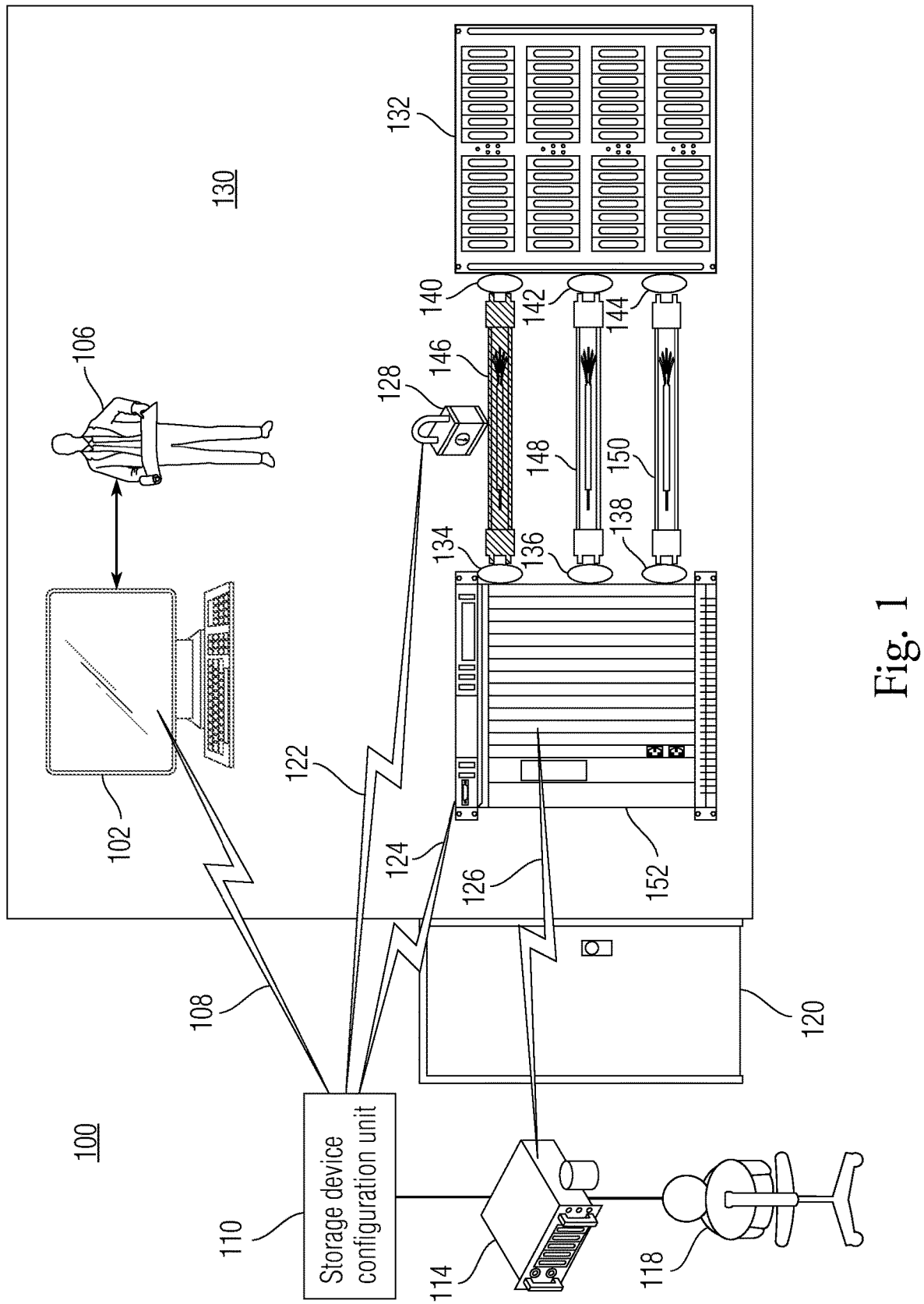
FIG. 1 is a system diagram of a system effective to facilitate network cable security in accordance with one or more disclosed embodiments.

FIG. 1 illustrates a network cable security system 100 in accordance with one or more embodiments according to the disclosure. Network cable security system 100 includes a storage administrator 118 effective to communicate with a source computer 114. Storage administrator 118 is responsible for managing and configuring storage disks to customers remotely. A storage device configuration unit 110 is in communication with source computer 114. In some implementations, the administrator 118 is a person, but the actions described herein by the administrator can be made by a machine executing code that responds to requests in a programmatic way, in accordance with a prescribed configuration response or by operation of an inference engine executing therein.

Network cable security system 100 further includes a data center 130 schematically shown separate from storage administrator 118 with use of door 120, as the data center can be remote from the administrator 118. Data center 130 includes a switch 152 in communication with a storage unit 132. Switch 152 includes ports 134, 136 and 138. Storage unit 132 includes ports 140, 142, and 144. Switch 152 communicates with storage unit 132 through one or more cables 146, 148, 150. Cables 146, 148, 150 are, for example, electrical or optical cables. Cables 146, 148 and 150, connect ports 134 with 140, 136 with 142, and 138 with 144, respectively. In some examples, cables 146, 148, 150 are fiber cables used between a storage attached network (SAN) switch and a storage system, cache cables used to flush data from storage memory to storage disks, or disk shelf cables. Moreover, while the present discussion is made in relation to switches and storage units, it will be apparent that other hardware devices are typically included in the data center 130 and are connected to further hardware devices with cables, and the description herein should be understood as being an example of interconnected hardware components within a data center to be serviced by a technician and not being a limitation on the more general kinds of hardware devices to which the present disclosure is more generally directed.

A physical lock 128 is connected to one or more cables, and locks one of the cables to a port. In the example shown, lock 128 locks cable 146 to port 134 of switch 152 and to port 140 of storage unit 132. A hardware engineer 106 works in data center 130 and has available to him or her a terminal 102 for communicating beyond the data center, such as to the administrator 118. Hardware engineer 106 is responsible for performing hardware related activities such as replacing storage disks, cables, motherboards, batteries, etc. Hardware engineers have access to data centers which have different types of hardware that can belong to multiple entities and be under the management of many different hardware engineers. In some examples, hardware engineer 106 and system administrator 118 are associated with different entities.

Storage device configuration unit 110 includes at least one processor and a memory which stores code. The code is used by the processor to configure the storage device configuration unit to perform multiple functions. First, the storage device configuration unit 110, in response to the code executing therein, communicates with terminal 102 through a communication link 108. Storage device configuration unit 110 communicates with lock 128 through a communication link 122. Storage device configuration unit 110 communicates with switch 152 through a communication link 124. In operation, storage administrator 118 controls source computer 114 to transmit data over communication link 126 to switch 152. Switch 152, in turn, transmits the data over the one or more cables 146, 148, 150 to storage unit 132. The transmitting of data is illustrated in FIG. 1 with the shading of cable 146 and illustrates data moving in any direction.

Figure 2:
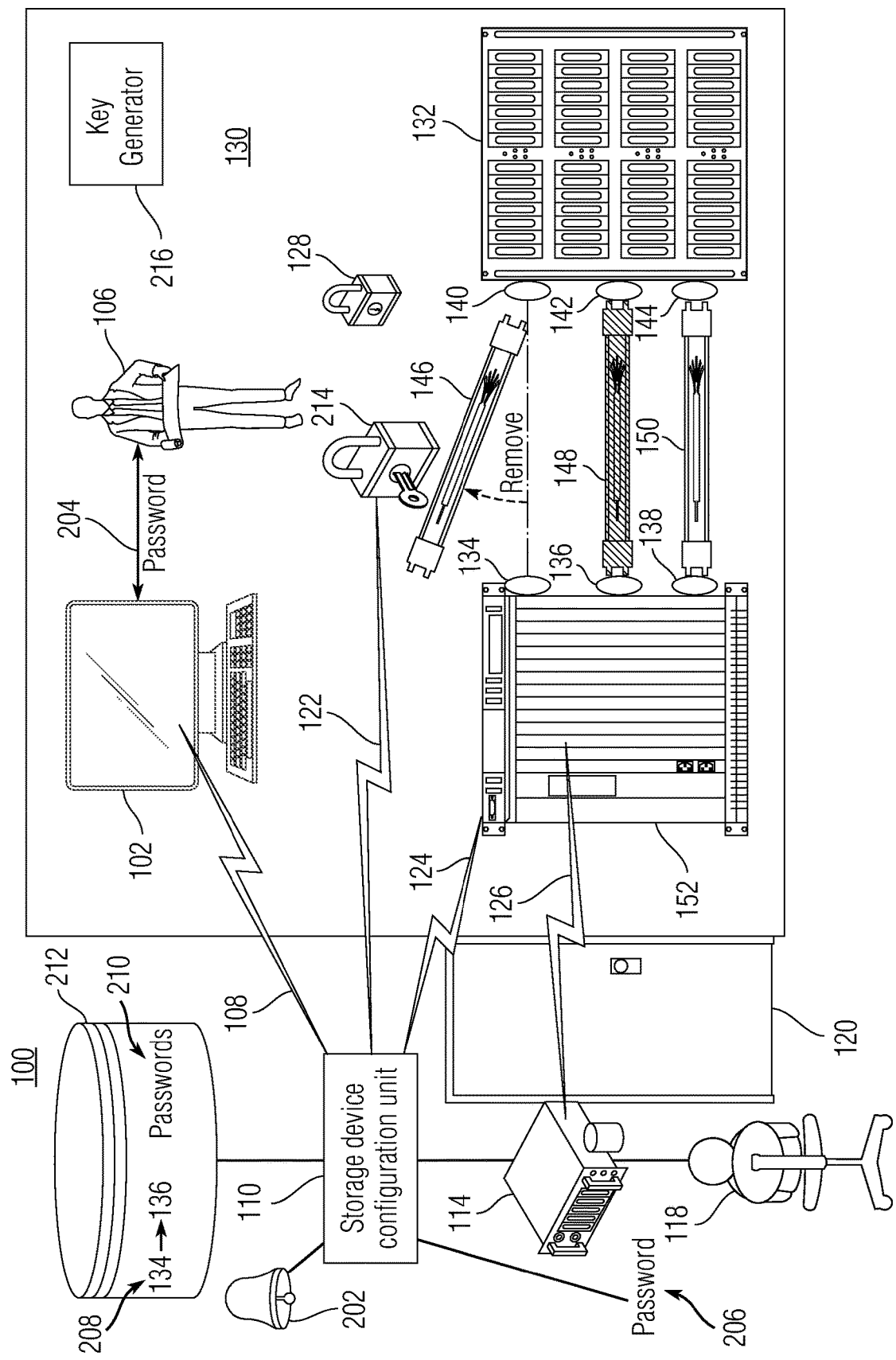
FIG. 2 is a system diagram of a system effective to facilitate network cable security in accordance with one or more disclosed embodiments.

FIG. 2 illustrates a network cable security system 100 in accordance with one or more embodiments of the disclosure. In examples where hardware engineer 106 wants to remove cable 146, hardware engineer communicates that request to remove cable 146 to storage administrator 118. Storage administrator 118, in turn, transmits a request including a password 206 to storage device configuration unit 110, either due to human operator action or programmatically by code executing at a computing device comprising the administrator 118. Hardware engineer 106 further transmits a request including a password 204 to terminal 102. Terminal 102 then transmits password 204 to storage device configuration unit 110. Storage device configuration unit 110, executing code so configure it for processing the so-transmitted (and now received) password, analyzes a list of passwords 210 in a memory 212. Storage device configuration unit 110, through the execution of further code, then authenticates either, or both, passwords 204 and 206. In examples where storage device configuration unit has not authenticated both passwords 204, 206 yet hardware engineer 106 attempts to remove cable 146, storage device configuration unit 110 is configured, by code, to generate an alarm 202. In these examples, lock 128 in maintained in the locked position and source computer 114 continues to transmit data through port 134 and cable 146. In some examples, storage device configuration unit 110 is configured by code to generate alarm 202 after storage device configuration unit 110 has failed two or more authentication attempts of passwords 204, 206. Alarm 202 is sent to a monitoring team to investigate data center 130.

In examples where storage device configuration unit 110 authenticates password 206 from storage administrator 118, storage device configuration unit 110, suspends data flow through port 134 and thereby cable 146 as the action it is configured to take by code executing therein. Through further code being executed, storage device configuration unit 110 virtually maps port 134 to port 136, in memory 212, and starts read and write operations through port 136 and cable 148. In some examples, both port 134 with cable 146, and port 136 with cable 148, are initially established to transmit data redundantly. In other examples, port 138 and cable 150, serve and remain as a redundant path for port 134 and cable 146, while data transmits through port 136 and cable 148. The unit 110 can have modes configured and settable to implement a solution in accordance with these differing examples. In either case, by storage device configuration unit 110 virtually remapping port 134 to port 136, a redundant path is maintained.

As discussed above, storage device configuration unit 110 virtually maps data flow from port 134 of switch 152, to port 136 of switch 152. The virtual mapping is illustrated by map 208. In this way, data continues to flow from source computer 114, through switch 152 to storage unit 132, even if cable 146 has been removed. Data throughout can be maintained and data corruption can be avoided in accordance with this scheme. In an example, storage device configuration unit 110 maps port 136 to have the same address or Worldwide Name (WWN) as port 134. Connected systems, such as source computer 114, are indifferent to the change to the path due to the removal of cable 146 and will continue transmitting data to the new virtual port 136.

If the code executing in the storage device configuration unit 110 does not authenticate password 204 entered by hardware engineer 106, data will continue to flow from source computer 114, through switch 152, port 136, and cable 148 to storage unit 132. In this example, where password 206 has been authenticated, but password 204 from hardware engineer 106 has not been authenticated, lock 128 is maintained in a locked position.

In examples where storage device configuration unit 110 authenticates both password 206 and password 204, storage device configuration unit is configured by code to transmit an unlock signal over communication link 122 to unlock physical lock 128, as shown as unlocked physical lock 214. Any locks connected to cables 148 and 150 are maintained in a locked position.

In some examples, password 204 and password 206 form, in combination, a single complex password. In some examples, passwords 204 and 206 are associated with cable 146 during initial set up or configuration of data center 130. In one example, a key generator 216 is used to generate passwords 204 and 206. Storage device configuration unit 110 is configured to generate alarm 202 to notify a management team that data flow through port 134 has been suspended. In some examples, hardware engineer 106 can have an appropriate password for port 136 but not for port 134. In these examples, an attempt to remove cable 146, connected to port 134, will not result in authentication of password 204.

Figure 3:
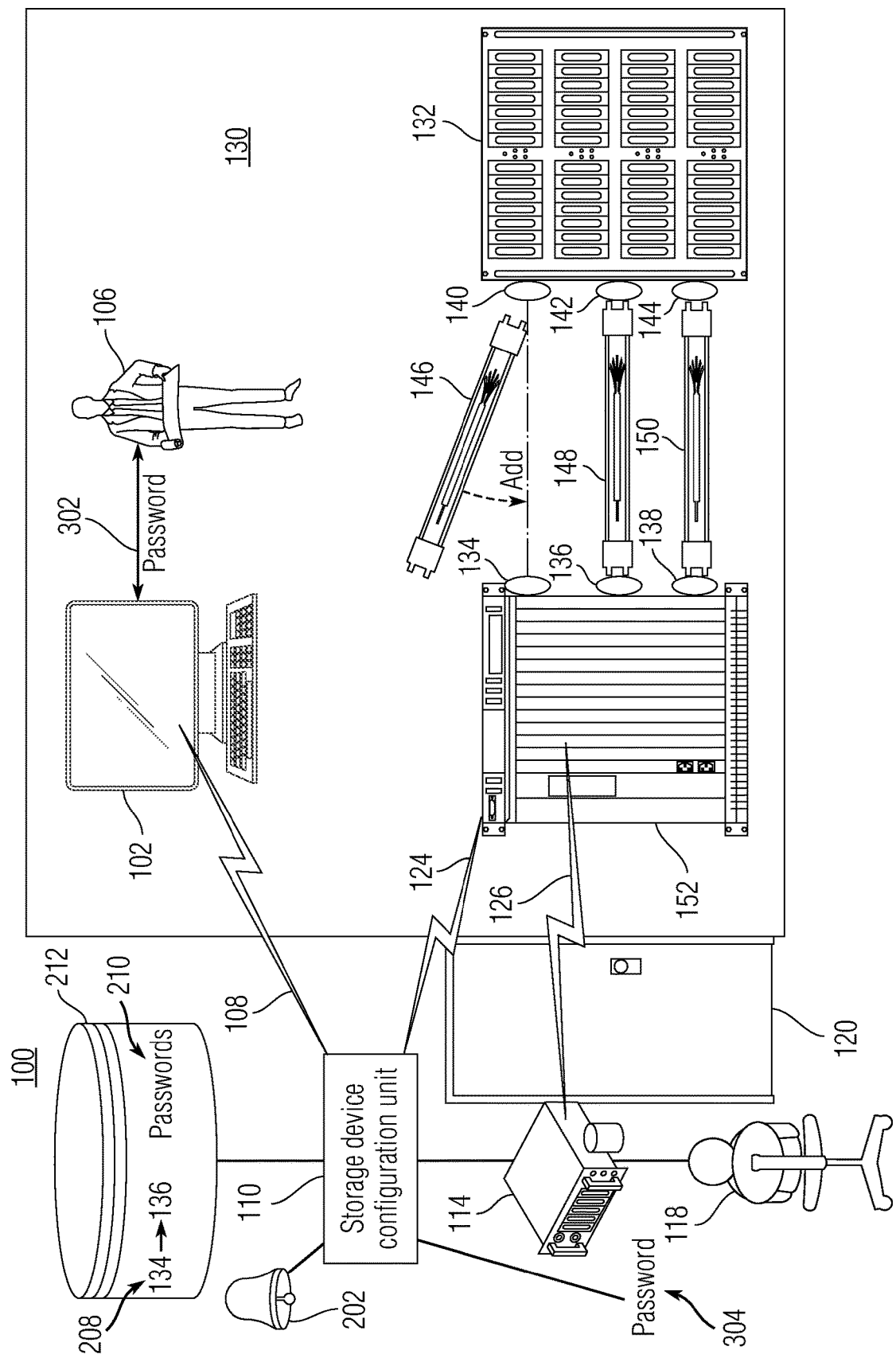
FIG. 3 is a system diagram of a system effective to facilitate network cable security in accordance with one or more disclosed embodiments.

FIG. 3 illustrates a network cable security system 100 in accordance with one or more embodiments of the disclosure. In examples where hardware engineer 106 wants to add a new cable to data center 130, hardware engineer 106 transmits a password 302 through terminal 102 to storage device configuration unit 110, which can be the same as the unit previously described. In some embodiments, all ports are physically locked by default. Storage administrator 118 also transmits a password 304 to storage device configuration unit 110. Storage device configuration unit 110 then analyzes list of passwords 210 and authenticates either or both of passwords 302, 304. In examples where either password 302, 304 is not authenticated, storage device authentication unit blocks port 134 from transmitting data and generates alarm 202. In this way, if hardware engineer 106 is a malicious actor wishing to transmit data to or receive data from data center 130, blocking of port 134 prevents the malicious actor from transmitting or receiving data.

Among other potential benefits, a system in accordance with the disclosure yields increased security for cables in a data center. When cables are removed, because of the described mapping, the system maintains consistent data throughput without causing data leakage, corruption, loss, slowness, or system degradation. Further, even if both a cable and its redundant cable are removed, because of the described mapping, a virtual path is available to maintain data flow. A virtual path is created to reroute data that was being transmitted through a physical path.

A convention system, without the benefit of this disclosure, can result in corrupt data storage, because of attempts to store data while a particular cable is removed. For example, if a cache cable is removed without preparation, data might not be flushed from memory to hard disks, resulting in data being lost. Moreover, a conventional system can result in system degradation or slowness, due to queued operations produced from a decreased number of paths. Virtually remapping allows for reuse of healthy ports because data that was using a disconnected port through a removed cable, will use another healthy port and another cable.

The system can be used during hardware maintenance or a physical upgrade of a storage system where replacing or adding of new cables occur. In some examples, where two paths are used to redundantly transmit data, and one cable breaks, the system will help avoid the possibility of a hardware engineer removing the healthy cable. Further, a hardware engineer in a shared data center will be prevented from removing a critical cable in a system they do not support.

The system can avoid the problem of an unauthorized hardware engineer being able to remove any cable from a storage system, even in the situation in which the data center 130 is shared by multiple entities with the hardware engineer having access to more physical hardware components than are within the ambit of his task or responsibilities. Further, even if the hardware engineer previously had an appropriate password, requiring authentication of both the password from the hardware engineer and the system administrator avoids the possibility of a hardware engineer removing a cable after his authority to remove the cable has terminated. A hardware engineer is prevented from selecting and removing an incorrect component. Human mistakes in removing cables can also be avoided and employee hours to identify data transmission problems can be reduced. Coordination among a system administrator and hardware engineer is facilitated and storage support teams are aware of what the hardware engineer will do even before he chooses to remove a cable. The storage support team is outside the data center, an operation management team is responsible for hardware and a security team is responsible to catch unauthorized persons. In some examples, all of these teams are notified by the alarm. Use of a complex password, with parts being used from both the storage administrator, and the hardware engineer, ensures that there is coordination among these entities. Authentication of both passwords is needed to redirect data and for the cable to be physically unlocked.

From the foregoing, it should be understood that the described method for providing cable security in a network can be part of a SAN Infrastructure between SAN switches and Enterprise Storage Systems. A request to remove a cable received at a system configured as described herein includes a first password and a second password. The cable connects a first port (e.g., of device A) and a second port (e.g., of device B). The ports can be of any of the devices mentioned above or other hardware components that might be located within the data center 130. After determining a first authenticity of the first password, data flow is suspended from flowing through the cable whose removal request has just been authenticated, causing the data to virtually map to a healthy port which utilizes the same identifications just made by storage device configuration unit 110. In particular, the first port is mapped to a third port which can be any available healthy port with low load and data flow is transmitted from this third port (that is, from device A) to the second port (of device B). As described above, an authenticity of a second password has to be determined by the storage device configuration unit 110. Upon making this determination, a physical lock connected to the cable is automatically unlocked by the system without human user intervention, that is to say, at the command of the program running in the configuring unit 110.

As described above, each hardware component is physically locked with required the first password and second password which must be authenticated in order to release it, including when there are multiple components in a single device, such as a rack, blade, etc.

Figure 4:
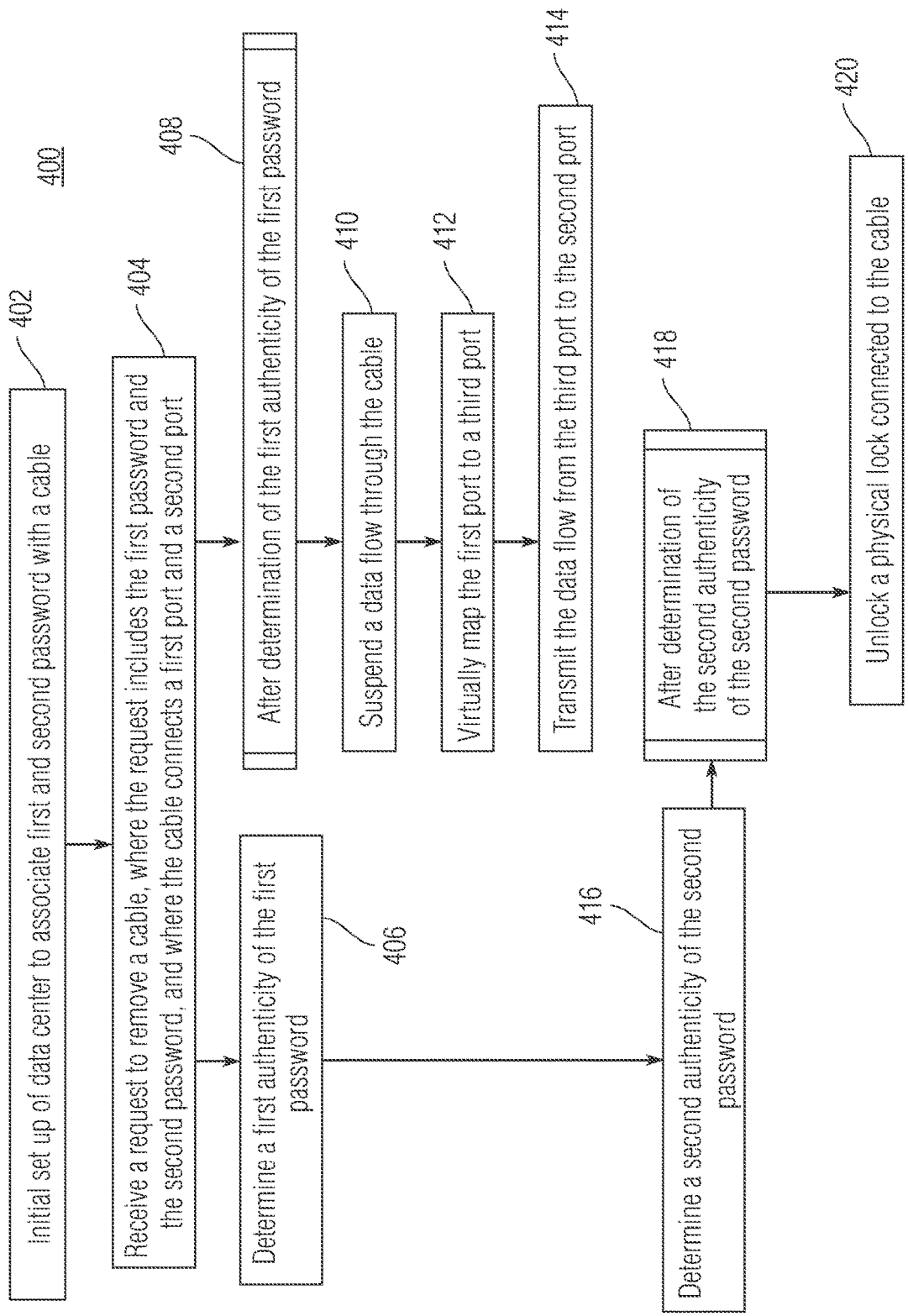
FIG. 4 is a process flow diagram of an exemplary routine for facilitating cable security in a network; in accordance with one or more disclosed embodiments.

FIG. 4 is a process flow diagram illustrating an exemplary routine 400 for facilitating cable security in a network as was shown and described in FIGS. 1-3. At 402, routine 400 performs an initial set up of a data center to associate a first and second password with a cable. This can be part of the storage device configuration unit 110, namely, part of the code provided to its processor for execution therein. At 404, routine 400 receives a request to remove the first cable, such as a message from the terminal 102 to the storage device configuration unit 110. The request includes the first and second password and, for instance can come from the terminal 102 located within the data center 130. The cable connects a first port with a second port. At 406, routine 400 executing in the storage device configuration unit 110 determines an authenticity of the first password. After determination of the first authenticity of the first password as shown in subroutine 408, the routine 400 includes program code operative to suspend a data flow through the cable at 410, virtually map the first port of the third port at 412, and transmit the data flow from the third port to the second port at 414. After 406, the code which implements routine 400 branches to 416, where the code configures the routine 400 to determine a second authenticity of the second password. After determination of the second authenticity of the second password as shown in subroutine 418, the routine 400 of the storage device configuration unit 110 unlocks a physical lock connected to the cable at 420. The process ends there, but as will be understood, further password keys can be provided, one after another, to authorize further cable and device removals, consistent with the disclosure above. Importantly, the authentication of one password pair is suitable for unlocking a given cable or device and is not operative to unlock any other device just because the hardware engineer provide an authenticated password for one connection.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an Ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, or computing resource that can transmit or receive data packets, instruction signals or data signals over a communication link. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (X), a central processing unit (CPU), a graphic processing unit (GPU), an application specific integrated circuit (ASIC), a compute core, a compute machine, a general purpose computer, a super computer, a personal computer, a laptop computer, a palmtop computer, a notebook computer, a desktop computer, a workstation computer, a server, a server farm, a computer cloud, or an array or system of processors, Xs, CPUs, GPUs, ASICs, general purpose computers, super computers, personal computers, laptop computers, palmtop computers, notebook computers, desktop computers, workstation computers, or servers.

The term "computer-readable medium" or "computer-readable storage medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, firmware, or a process that can be arranged to execute on a computing device or a communicating device.

The term "computing resource process," as used in this disclosure, means a computing resource that is in execution or in a state of being executed on an operating system of a computing device. Every computing resource that is created, opened or executed on or by the operating system can create a corresponding "computing resource process." A "computing resource process" can include one or more threads, as will be understood by those skilled in the art.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application includes, but is not limited to, a computing resource such as, for example, an application program that can accept connections to service requests from communicating devices by transmitting back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by transmitting back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for providing cable security in a network of computing devices connected by one or more physical cables, the method comprising:

receiving a request to remove a cable among the one or more physical cables, where the request includes a first password and a second password, and wherein the cable connects a first port and a second port, wherein the first and second password form one complex password associated with the cable;

prior to receiving the request, establishing the complex password during an initial set up of the network, wherein the complex password is generated by a key generator;

determining, in response to the request, a first authenticity of the first password;

after determining the first authenticity of the first password suspending a data flow through the cable;

virtually mapping, by a storage device configuration unit, the first port to a third port; and transmitting the data flow from the third port to the second port;

determining an authenticity of the second password; and after determining the authenticity of the second password, unlocking a physical lock connected to the cable thereby allowing the cable to be disconnected from one or more of the first port and the second port.

2. The method of claim 1, further comprising maintaining another lock, connected to another cable, in a locked position.

3. The method of claim 1, wherein suspending the data flow through the cable includes suspending the data flow through the first port.

4. The method of claim 1, further comprising, prior to receiving the request, establishing a fourth port to transmit data redundantly for the first port.

5. The method of claim 1, further comprising, prior to receiving the request, transmitting the data flow from the first port to the second port.

6. The method of claim 1, wherein virtually mapping includes assigning a virtual address to the first port and to the third port.

7. The method of claim 1, wherein the first is a first request, and the method further comprises receiving a second request to add a second cable to a fourth port in the network, wherein the second request includes a third password.

8. The method of claim 7, wherein the third password is received from a hardware engineer, and wherein the method further comprises:

determining that the third password is not authentic; and blocking the fourth port.

9. The method of claim 7, wherein the third password includes a fourth password received from a hardware engineer and includes fifth password received from a system administrator, wherein the method further comprises:
- determining that either the fourth or the fifth password is not authentic; and
- blocking the fourth port.

10. A network cable security system for providing cable security in a network of computing devices connected by one or more physical cables in a data center, the system comprising:
- a memory configured to store a list of passwords;
- a storage device configuration unit configured to be in communication with the memory, the storage device configuration unit effective to:
- receive a request to remove a first cable among the one or more cables, wherein the request includes a first password and a second password, and wherein the first cable connects a first port and a second port, wherein the first and second password form one complex password associated with the cable and wherein, prior to receipt of the request, the storage device configuration unit is effective to establish the complex password during an initial set up of the network, wherein the complex password is generated by key generator;
- analyze the list of passwords in the memory to determine a first authenticity of the first password;
- after determination of the first authenticity of the first password:
- suspend a data flow through the cable;
- virtually map the first port to a third port; and transmit the data flow from the third port to the second port;
- analyze the list of passwords to determine an authenticity of the second password; and after determination of the authenticity of the second password, the storage device configuration unit effective to unlock a physical lock connected to the cable, thereby allowing the cable to be disconnected from one or more of the first port and the second port.

11. The network cable security system of claim 10, wherein suspension of the data flow through the cable includes suspension of the data flow through the first port.

12. The network cable security system of claim 10, wherein, prior to receipt of the request, the storage device configuration unit establishes a fourth port to transmit data redundantly for the first port.

13. The network cable security system of claim 10, wherein, prior to receipt the request, a source computer transmits the data flow from the first port to the second port.

14. The network cable security system of claim 10, wherein the virtual map includes assignation of a virtual address to the first port and to the third port.

* * * * *